United States Patent
Uchikawa

(10) Patent No.: US 9,411,546 B2
(45) Date of Patent: Aug. 9, 2016

(54) INFORMATION PROCESSING APPARATUS, CONTROL METHOD FOR CONTROLLING THE SAME, AND STORAGE MEDIUM

(71) Applicant: CANON KABUSHIKI KAISHA, Tokyo (JP)

(72) Inventor: Shinichi Uchikawa, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/842,042

(22) Filed: Sep. 1, 2015

(65) Prior Publication Data
US 2016/0070513 A1  Mar. 10, 2016

(30) Foreign Application Priority Data

Sep. 4, 2014 (JP) .................................. 2014-180494

(51) Int. Cl.
*G06F 3/12* (2006.01)
*H04L 29/06* (2006.01)

(52) U.S. Cl.
CPC ............ *G06F 3/1236* (2013.01); *G06F 3/1222* (2013.01); *G06F 3/1292* (2013.01); *H04L 69/18* (2013.01)

(58) Field of Classification Search
USPC ....................................................... 358/1.15
See application file for complete search history.

(56) References Cited

U.S. PATENT DOCUMENTS

| | | | | | |
|---|---|---|---|---|---|
| 7,581,050 | B2 * | 8/2009 | Honda | ................... | G06F 3/1207 709/223 |
| 7,844,704 | B2 * | 11/2010 | Tamura | ................... | G06F 9/542 709/223 |
| 8,705,093 | B2 * | 4/2014 | Gha | ................... | H04N 1/32534 358/1.1 |
| 2011/0055736 | A1 * | 3/2011 | Kang | ................. | H04N 1/00424 715/760 |

FOREIGN PATENT DOCUMENTS

| | | |
|---|---|---|
| EP | 2566210 A1 | 3/2013 |
| JP | 2010-113400 A | 5/2010 |

OTHER PUBLICATIONS

Extended European Search Report issued in related Application No. EP15178582.1 on Feb. 12, 2016.
Box et al., "Web Services Eventing (WS-Eventing)", Internet <URL: http://www.w3.org/Submission/WS-Eventing/>, W3C Member Submission, Mar. 15, 2006, pp. 1-21.

* cited by examiner

*Primary Examiner* — Allen H Nguyen
(74) *Attorney, Agent, or Firm* — Carter, DeLuca, Farrell & Schmidt, LLP

(57) ABSTRACT

Provided is a technique for preventing registration regarding event notifications to a communication apparatus from remaining in an information processing apparatus after a communication session using a direct connection between the information processing apparatus and the communication apparatus is disconnected. The information processing apparatus (image forming apparatus) performs, upon receiving from the communication apparatus (mobile terminal) a registration request regarding an event to be notified to the mobile terminal in the case where the event occurs in the image forming apparatus, registration regarding the event in accordance with the received registration request. When a WiFi-Direct connection to a specific mobile terminal is disconnected, the image forming apparatus identifies, among registered events, an event in which that specific mobile terminal is registered as a communication destination, and cancels the registration regarding the identified event.

12 Claims, 8 Drawing Sheets

F I G. 3
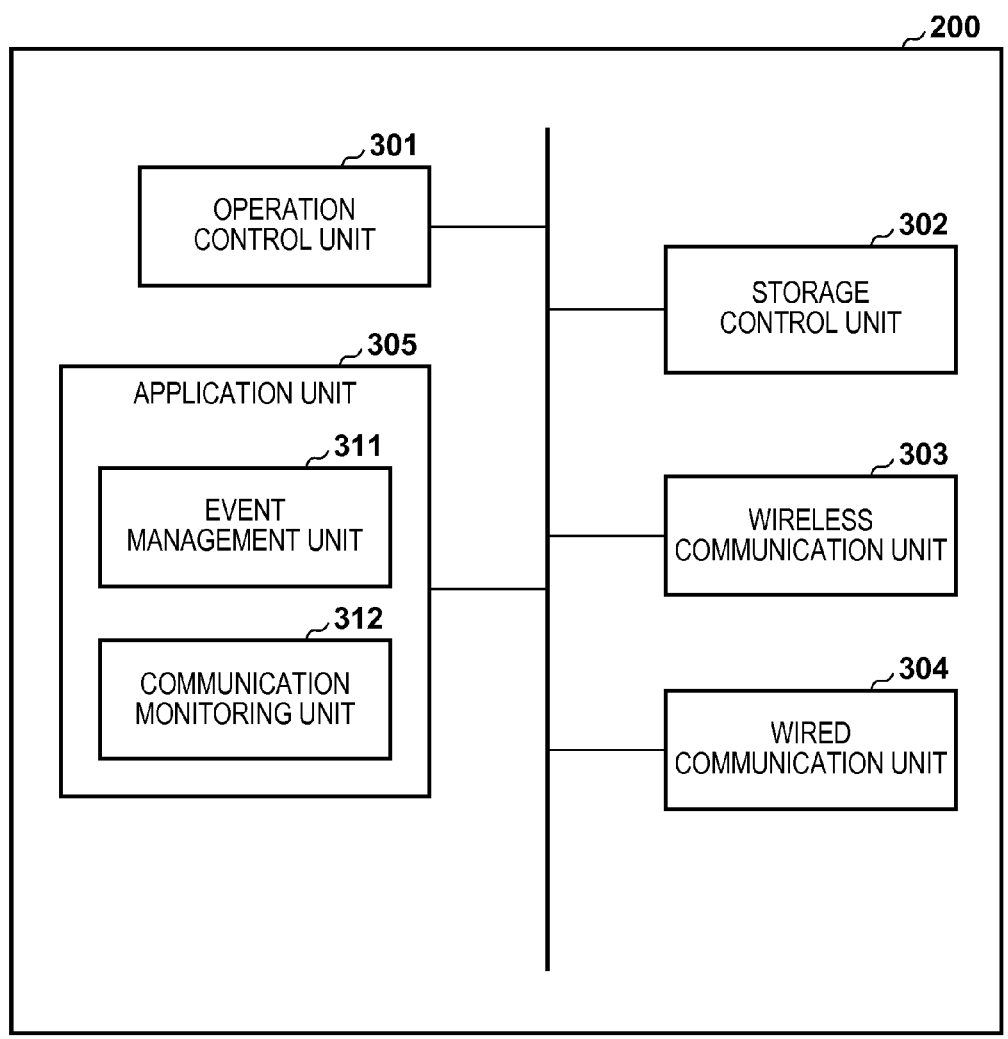

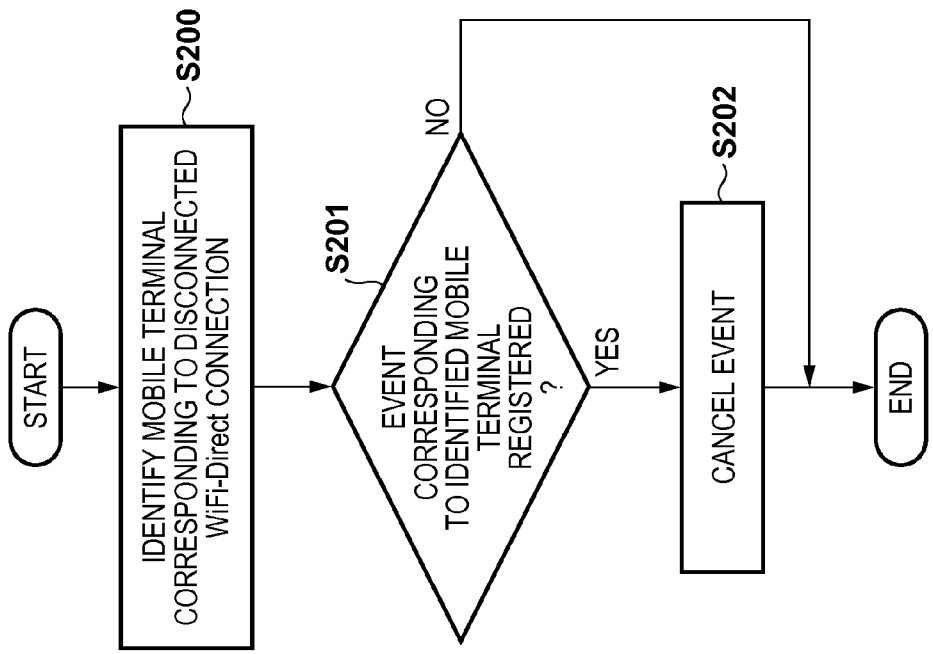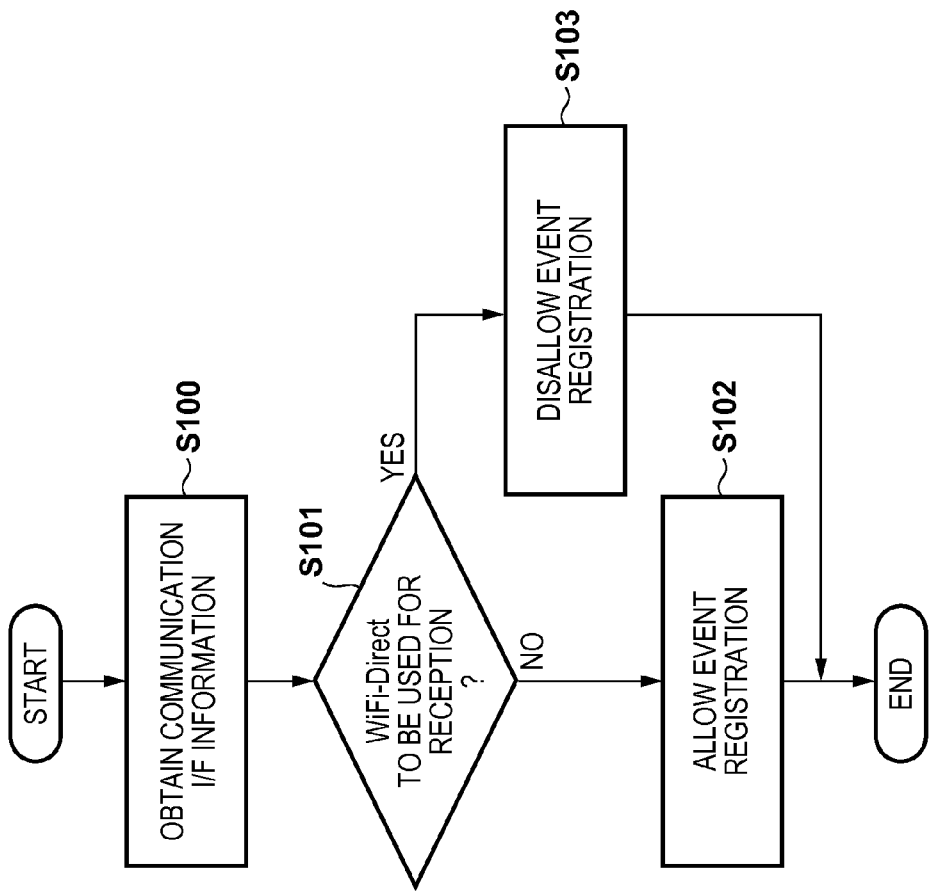

INFORMATION PROCESSING APPARATUS, CONTROL METHOD FOR CONTROLLING THE SAME, AND STORAGE MEDIUM

BACKGROUND OF THE INVENTION

1. Field of the Invention

The present invention relates to an information processing apparatus, a control method for controlling the same, and a storage medium.

2. Description of the Related Art

In recent years, even among printing apparatuses such as multifunctional printers or printers, the number of apparatuses equipped with a wireless LAN function has been increasing. A printing apparatus equipped with the wireless LAN function can be wirelessly connected as a client to an access point. On the other hand, a PC or a mobile terminal performs communication with the printing apparatus via the access point, transmitting print data to the printing apparatus to be printed, and receiving device information from the printing apparatus to be used for device control.

In relation to the above-described wireless LAN, a standard called Wi-Fi Direct® has been established by Wi-Fi Alliance. In Wi-Fi Direct, a protocol for determining whether each wireless terminal operates as an access point or a client is defined. By executing this protocol, it is possible to automatically determine which wireless terminal operates as an access point and which wireless terminal operates as a client. When this Wi-Fi Direct is used, one of the wireless terminals automatically operates as an access point without needing a separate access point, thus enabling direct wireless communication to be executed between the wireless terminals. Various types of application services (such as image sharing and printing) can be executed between wireless terminals by using Wi-Fi Direct.

Moreover, as a technique for performing printing from terminals such as mobile terminals, WSD (Web Service on Device) exists. In WSD, a WS-Eventing (Web Services Eventing) technique is used as a mechanism of event notifications to a terminal in order to monitor the state of the image forming apparatus and the state of jobs (refer to "Web Services Eventing (WS-Eventing)", Internet <URL: http://www.w3.org/Submission/WS-Eventing/>). In the case of executing printing on the image forming apparatus using terminal WSD, the terminal performs registration, in the image forming apparatus, regarding event notifications to be received using WS-Eventing. Specifically, the terminal registers the content of events and notification destinations in the image forming apparatus. Accordingly, the terminal can obtain, from the image forming apparatus that is to execute printing, a notification regarding the state of the image forming apparatus and the state of a job. When an event registered by the terminal occurs, the image forming apparatus transmits the event notification regarding the event that has occurred to the registered notification destination. The event registered in the image forming apparatus is effective until a designated expiration date of an effective period is reached or until the terminal performs termination notification for the event notification, to the image forming apparatus.

In the case where a terminal is connected to an image forming apparatus such as a multifunctional printer or a printer using Wi-Fi Direct and printing is executed using WSD, the terminal, after being connected to the image forming apparatus, performs the above-described registration regarding the event notification in the image forming apparatus. After transmitting print data (print job) to the image forming apparatus to start printing, the terminal can check the state of the image forming apparatus and the execution state of the print job by using the event notification transmitted from the image forming apparatus.

However, it is possible that the terminal disconnects the Wi-Fi Direct connection to the image forming apparatus after transmission of the print data. Examples of such situations include the case where the terminal performs a new wireless LAN connection or a new Wi-Fi Direct connection with another apparatus or access point, and the case where the terminal is moved out of the communication range of Wi-Fi Direct with the image forming apparatus, for example. There is also the case where the number of connections (that is, the number of communication sessions) using Wi-Fi Direct to the image forming apparatus reaches an upper limit and communication between the terminal and the image forming apparatus has not occurred for a certain period of time.

In such cases, the image forming apparatus can no longer transmit event notifications to the terminal. Moreover, unless the terminal requests the image forming apparatus to cancel registration regarding event notifications, registration information can remain in the image forming apparatus. In this case, due to a limited storage capacity of the image forming apparatus, it is possible that another terminal cannot newly perform registration regarding event notifications in the image forming apparatus. Furthermore, in the case where another terminal connects to the image forming apparatus using Wi-Fi Direct in place of the terminal that has disconnected the Wi-Fi Direct connection and the IP addresses of both these terminals are identical, it is possible for the image forming apparatus to transmit an event notification to the incorrect notification destination. That is, a security problem can arise.

As a technique for addressing the above-described problem, Japanese Patent Laid-Open No.2010-113400 proposes a technique for, when a registered event occurs and an event notification is transmitted, confirming whether or not the registered notification destination exists, and canceling information regarding that notification destination in the case where the destination does not exist.

However, the printer in Japanese Patent Laid-Open No.2010-113400 does not perform cancellation of the notification destination regarding the registered event unless that event occurs. For example, unless an event in which that terminal serves as the notification destination occurs, the registration regarding that event remains without being canceled, even after the WiFi-Direct connection between the printer and the terminal is disconnected. Moreover, in the case where another terminal connects to the printer using Wi-Fi Direct in place of the terminal that has disconnected the Wi-Fi Direct connection and the IP addresses of both these terminals are identical, the notification destination will not be canceled due to the existence of a registered notification destination. As described above, it can be said that it is difficult to sufficiently address the above-described problem using the technique described in Japanese Patent Laid-Open No.2010-113400.

SUMMARY OF THE INVENTION

The present invention has been made in light of the above-described problems. The present invention provides a technique for preventing registration regarding event notifications to a communication apparatus (mobile terminal) from remaining in an information processing apparatus (image forming apparatus) after a communication session between the information processing apparatus and the communication apparatus using a direct connection is disconnected.

According to one aspect of the present invention, there is provided an information processing apparatus communicable with an external apparatus, comprising: a reception unit configured to receive, from the external apparatus, an event registration request for requesting the information processing apparatus to notify an event in a case where the event occurs in the information processing apparatus, the event registration request containing notification destination information which indicates a notification destination of the event; an identification unit configured to identify a communication scheme used for receiving the event registration request in a case where the event registration request is received by the reception unit; and a control unit configured to prohibit registration of a content of the event to be notified and the notification destination information that are identified by the event registration request, in a case where the communication scheme identified by the identification unit is a predetermined communication scheme in which the external apparatus and the information processing apparatus execute direct wireless communication.

According to another aspect of the present invention, there is provided an information processing apparatus capable of executing direct wireless communication with an external apparatus, comprising: a registration unit configured to register a content of an event to be notified in a case where the event occurs in the information processing apparatus and notification destination information of the event; a determination unit configured to determine whether or not event information corresponding to the external apparatus is registered by the registration unit, in a case where a wireless connection established between the external apparatus and the information processing apparatus is disconnected; and a cancellation unit configured to cancel the event information corresponding to the external apparatus in a case where the determination unit determines that the event information corresponding to the external apparatus is registered by the registration unit.

According to still another aspect of the present invention, there is provided a control method for controlling an information processing apparatus communicable with an external apparatus, the method comprising: receiving, from the external apparatus, an event registration request for requesting the information processing apparatus to notify an event in a case where the event occurs in the information processing apparatus, the event registration request containing notification destination information which indicates a notification destination of the event; identifying a communication scheme used for receiving the event registration request in a case where the event registration request is received in the receiving; and prohibiting registration of a content of the event to be notified and the notification destination information that are identified by the event registration request, in a case where the communication scheme identified in the identifying is a predetermined communication scheme in which the external apparatus and the information processing apparatus execute direct wireless communication.

According to yet still another aspect of the present invention, there is provided a control method for controlling an information processing apparatus capable of executing direct wireless communication with an external apparatus, the method comprising: registering a content of an event to be notified in a case where the event occurs in the information processing apparatus and notification destination information of the event; determining whether or not event information corresponding to the external apparatus is registered in the registering, in a case where a wireless connection established between the external apparatus and the information processing apparatus is disconnected; and canceling the event information corresponding to the external apparatus in a case where it is determined in the determining that the event information corresponding to the external apparatus is registered in the registering.

According to still yet another aspect of the present invention, there is provided a non-transitory computer-readable storage medium storing a computer program for causing a computer to execute a control method for controlling an information processing apparatus communicable with an external apparatus, the method comprising: receiving, from the external apparatus, an event registration request for requesting the information processing apparatus to notify an event in a case where the event occurs in the information processing apparatus, the event registration request containing notification destination information which indicates a notification destination of the event; identifying a communication scheme used for receiving the event registration request in a case where the event registration request is received in the receiving; and prohibiting registration of a content of the event to be notified and the notification destination information that are identified by the event registration request, in a case where the communication scheme identified in the identifying is a predetermined communication scheme in which the external apparatus and the information processing apparatus execute direct wireless communication.

According to yet still another aspect of the present invention, there is provided a non-transitory computer-readable storage medium storing a computer program for causing a computer to execute a control method for controlling an information processing apparatus capable of executing direct wireless communication with an external apparatus, the method comprising: registering a content of an event to be notified in a case where the event occurs in the information processing apparatus and notification destination information of the event; determining whether or not event information corresponding to the external apparatus is registered in the registering, in a case where a wireless connection established between the external apparatus and the information processing apparatus is disconnected; and canceling the event information corresponding to the external apparatus in a case where it is determined in the determining that the event information corresponding to the external apparatus is registered in the registering.

According to the present invention, it is possible to prevent registration regarding event notifications to a communication apparatus (mobile terminal) from remaining in an information processing apparatus (image forming apparatus) after a communication session between the information processing apparatus and the communication apparatus using a direct connection is disconnected.

Further features of the present invention will become apparent from the following description of exemplary embodiments (with reference to the attached drawings).

BRIEF DESCRIPTION OF THE DRAWINGS

FIG. 3 is a block diagram showing an example of the software configuration of an image forming apparatus.

FIG. 6 is a flowchart showing a procedure of event registration processing that is executed in an image forming apparatus.

FIG. 7 is a flowchart showing a procedure of event registration processing that is executed in an image forming apparatus.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Configuration of Communication System

Figure 1:
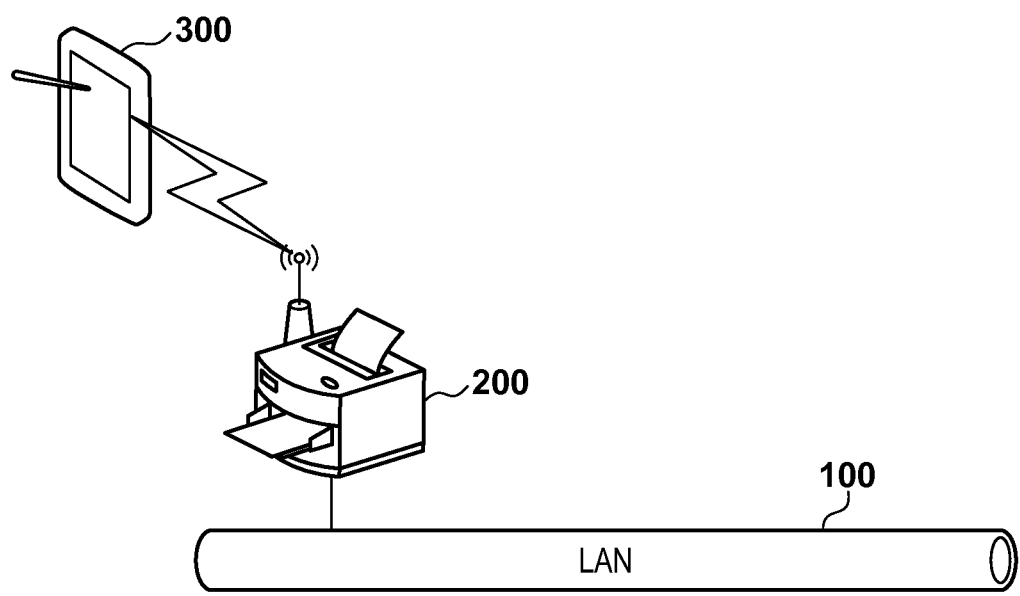
FIG. 1 is a diagram showing an example of the configuration of a communication system.

FIG. 1 is a diagram showing an example of the configuration of a communication system according to an embodiment. This communication system includes at least a LAN 100, an image forming apparatus 200, and a mobile terminal 300. The image forming apparatus 200 and the mobile terminal 300 can communicate with each other without intervention of an access point by connecting using Wi-Fi Direct®, which is a communication scheme using a wireless LAN scheme. The mobile terminal 300 can transmit print data (image data) to the image forming apparatus 200 with direct communication using Wi-Fi Direct (Wi-Fi Direct communication), and cause the image forming apparatus 200 to execute printing based on the print data. Note that the image forming apparatus 200 is one example of an information processing apparatus that can communicate with an external communication apparatus.

Furthermore, the image forming apparatus 200 is also connected to the LAN 100, which is a wired network, and can communicate with an external apparatus via the LAN 100. Moreover, as described later, it is also possible to connect the mobile terminal 300 to a wired network.

Configuration of Image Forming Apparatus

Figure 2:
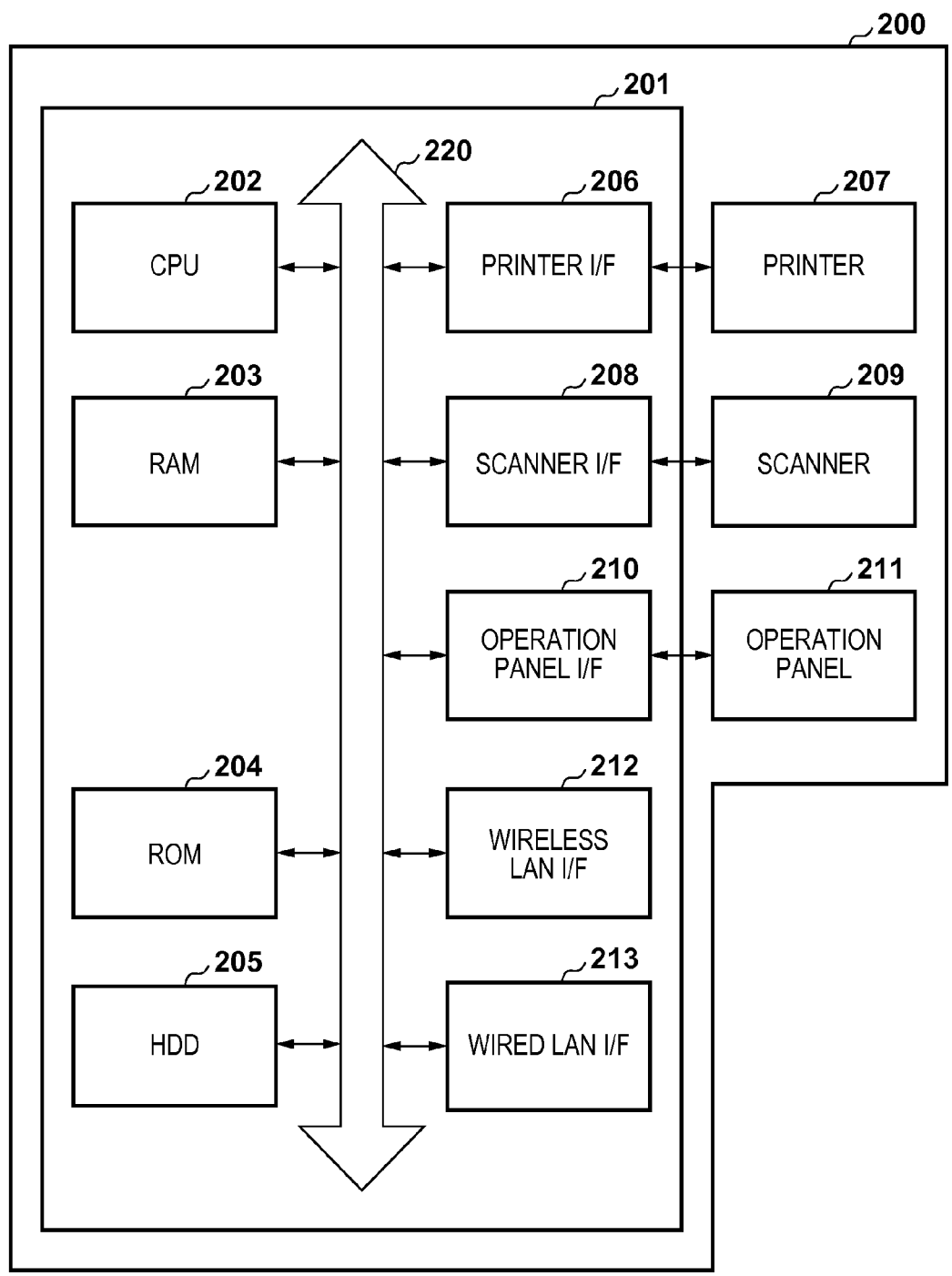
FIG. 2 is a block diagram showing an example of the hardware configuration of an image forming apparatus.

FIG. 2 is a block diagram showing an example of the hardware configuration of the image forming apparatus 200. The image forming apparatus 200 is provided with a control unit 201, a printer (printer engine) 207 connected to the control unit 201, a scanner (scanner engine) 209, and an operation panel 211. The control unit 201 controls each device connected to the control unit 201 so as to realize various types of functions such as print, scan, copy, and FAX in the image forming apparatus 200.

The control unit 201 is provided with a CPU 202, a RAM 203, a ROM 204, a hard disk drive (HDD) 205, a printer interface (I/F) 206, a scanner I/F 208, an operation panel I/F 210, a wireless LAN I/F 212, and a wired LAN I/F 213 as devices connected to a system bus 220.

The CPU 202 controls each device connected thereto via the system bus 220 so as to control the overall operations of the image forming apparatus 200. The RAM 203 is used as a main memory of the CPU 202 or a temporary storage area such as a work area. The ROM 204 stores a control program of the image forming apparatus 200. The CPU 202 reads out, to the RAM 203, the control program stored in the ROM 204 and executes the program so as to perform a variety of control in the image forming apparatus 200 such as communication control and print control. The HDD 205 is used for storing various types of programs and data.

The printer I/F 206 is an interface for connecting the printer 207 and the control unit 201. The printer I/F 206 outputs an image signal to the printer 207 and outputs a control signal from the CPU 202 to the printer 207. The printer 207 executes printing based on the image signal input from the printer I/F 206 in accordance with the control signal from the CPU 202.

The scanner I/F 208 is an interface for connecting the scanner 209 and the control unit 201. The scanner I/F 208 outputs a control signal from the CPU 202 to the scanner 209, and inputs, to the control unit 201, an image signal obtained by reading an image and output from the scanner 209. The CPU 202 executes predetermined image processing on the image signal input via the scanner I/F 208 and outputs the signal as an image signal for printing to the printer 207 via the printer I/F 206 so that a copy function in the image forming apparatus 200 can be realized.

The operation panel I/F 210 is an interface for connecting the operation panel 211 and the control unit 201. The operation panel 211 is provided with a liquid crystal display unit having a touch panel function, a keyboard, and the like.

The wireless LAN I/F 212 is used for performing wireless communication with an external apparatus via an antenna for a wireless LAN (not illustrated) using a wireless LAN scheme or Wi-Fi Direct. For example, the wireless LAN I/F 212 can perform communication with an access point using the wireless LAN scheme, or direct communication with an external apparatus such as the mobile terminal 300 using Wi-Fi Direct (Wi-Fi Direct communication). The CPU 202 is communicable with an external apparatus such as the mobile terminal 300 via the wireless LAN I/F 212, and can transmit various types of information to the external apparatus or receive various types of information from the external apparatus.

The wired LAN I/F 213 is connected to a LAN cable (not illustrated) and connected to the LAN 100. The wired LAN I/F 213 is communicable with an external apparatus via the LAN 100.

The CPU 202 is communicable with an external apparatus via the wireless LAN I/F 212 or the wired LAN I/F 213, and can transmit various types of information to the external apparatus or receive various types of information from the external apparatus. For example, the CPU 202 receives print data from the external apparatus via the wireless LAN I/F 212 or the wired LAN I/F 213, and causes the printer 207 to execute print processing based on the received print data.

Note that, in this embodiment, a mode is shown as one example in which one CPU 202 uses one memory (the RAM 203) to control the operations of the image forming apparatus 200, but it is also possible to change this mode to other modes. For example, a plurality of CPUs and a plurality of memories may cooperate.

FIG. 3 is a block diagram showing an example of the software configuration of the image forming apparatus 200. Each of functional units shown in FIG. 3 is realized in the image forming apparatus 200 by the CPU 202 reading out, to the RAM 203, a control program stored in the ROM 204 or the HDD 205 and executing the program.

An operation control unit 301 controls the operations of the operation panel 211. For example, the operation control unit 301 causes the operation panel 211 to display an operation screen, and also accepts input of an instruction by a user via the operation screen displayed on the operation panel 211.

The operation control unit 301 notifies another functional unit of the user instruction accepted via the operation panel 211, and also updates the operation screen that is displayed on the operation panel 211 in accordance with the accepted user instruction. A storage control unit 302 stores designated data in the RAM 203 or the HDD 205 or reads out designated data from the RAM 203 or the HDD 205 in accordance with an instruction from the other functional unit.

A wireless communication unit 303 controls wireless communication executed using the wireless LAN I/F 212. A wired communication unit 304 controls communication executed using the wired LAN I/F 213. An application (APP) unit 305 includes at least an event management unit 311 and a communication monitoring unit 312, and is composed of a plurality of modules.

The event management unit 311 manages events registered from the mobile terminal 300. For example, the event management unit 311 receives, from the mobile terminal 300 via the wireless communication unit 303 or the wired communication unit 304, a registration request regarding an event to be notified to the mobile terminal 300 in the case where the event occurs in the image forming apparatus 200. The event management unit 311 controls the registration of the event in accordance with the received registration request and cancellation of the registration regarding the event, and performs the notification of the registered event using WS-Eventing.

The communication monitoring unit 312 monitors a state of a WiFi-Direct connection using the wireless communication unit 303 and notifies, in the case where disconnection of the WiFi-Direct connection is detected, the event management unit 311 of this detection result.

Configuration of Mobile Terminal

Figure 4:
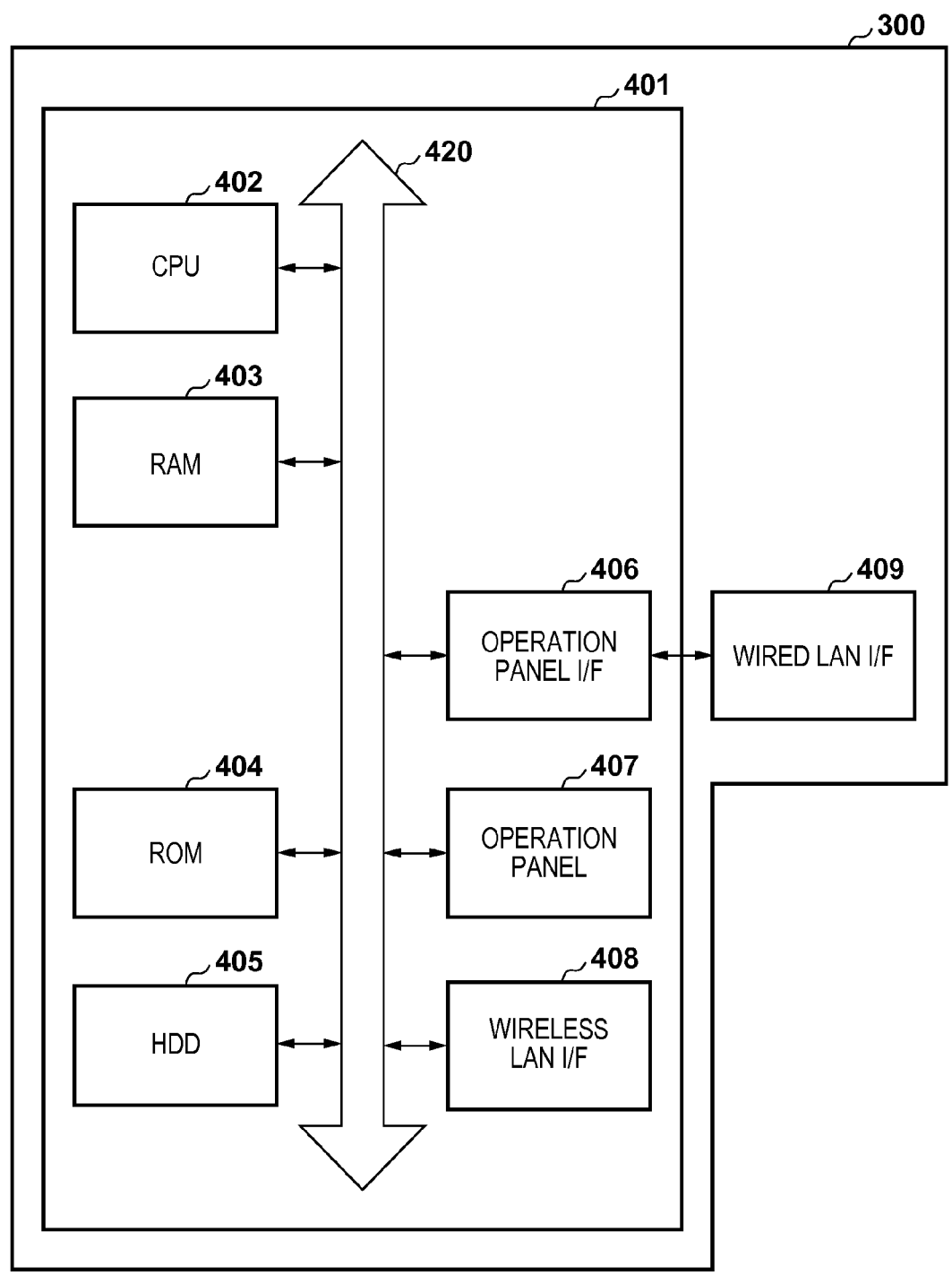
FIG. 4 is a block diagram showing an example of the hardware configuration of a communication terminal.

FIG. 4 is a block diagram showing an example of the hardware configuration of the mobile terminal 300. The mobile terminal 300 is provided with a control unit 401 and an operation panel 409 connected to the control unit 401. The mobile terminal 300 is provided with a CPU 402, a RAM 403, a ROM 404, an HDD 405, an operation panel 406, a wireless LAN I/F 407, and a wired LAN I/F 408 as devices connected to a system bus 420.

The RAM 403 is used as a main memory of the CPU 402 or a temporary storage area such as a work area. The ROM 404 stores a control program of the mobile terminal 300. The CPU 402 reads out, to the RAM 403, the control program stored in the ROM 404 and executes the program so as to control the overall operations of the mobile terminal 300. The HDD 405 is used for storing various types of programs, data and information tables.

The operation panel 409 displays various screens such as an operation screen. The operation panel 409 has a touch panel function, and can accept a touch operation by a user. The user can input various instructions to the mobile terminal 300 by performing touch operations (gesture operations) such as a drag operation and a flick operation using the touch panel function in accordance with the display on the operation panel 409.

The wireless LAN I/F 407 is used for performing wireless communication with an external apparatus via an antenna for a wireless LAN (not illustrated) using a wireless LAN scheme or Wi-Fi Direct. The wired LAN I/F 408 is connectable to a LAN cable (not illustrated). The wired LAN I/F 213 is, in the case where it is connected to a wired LAN, communicable with an external apparatus via the wired LAN. For example, the mobile terminal 300 can execute event registration in the image forming apparatus 200, transmission of print data and the like using communication via the wireless LAN I/F 407 or the wired LAN I/F 408.

Note that, in the present embodiment, a mode is shown as one example in which one CPU 402 uses one memory (the RAM 403) to control the operations of the mobile terminal 300, but it is also possible to change this mode to other modes. For example, a plurality of CPUs and a plurality of memories may cooperate.

Figure 5:
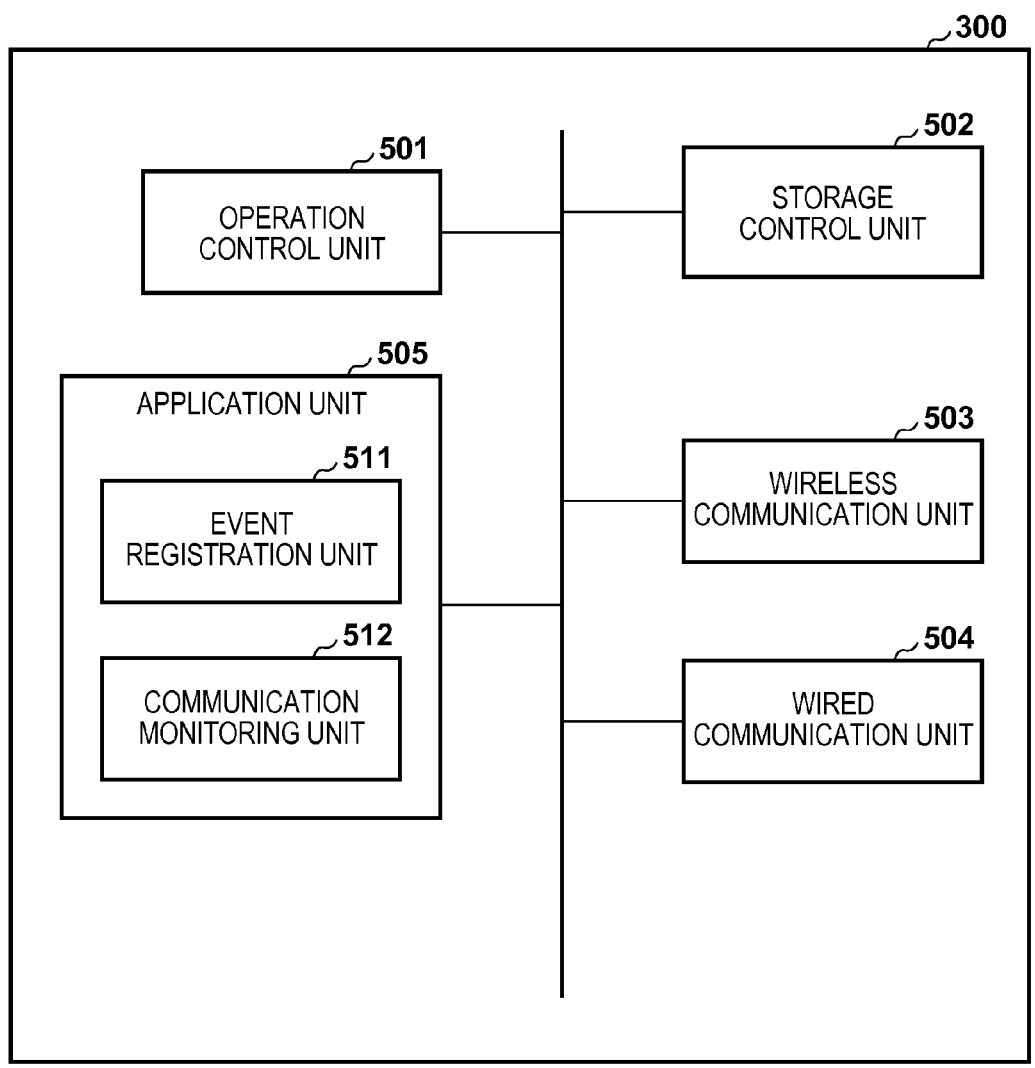
FIG. 5 is a block diagram showing an example of the software configuration of a communication terminal.

FIG. 5 is a block diagram showing an example of the software configuration of the mobile terminal 300. Each of functional units shown in FIG. 5 is realized in the mobile terminal 300 by the CPU 402 reading out, to the RAM 403, a control program stored in the ROM 404 or the HDD 405 and executing the program.

An operation control unit 501 controls the operations of the operation panel 409. For example, the operation control unit 501 causes the operation panel 409 to display an operation screen, and also accepts input of an instruction by a user via the operation screen displayed on the operation panel 409. The operation control unit 501 notifies another functional unit of the user instruction accepted via the operation panel 409, and also updates the operation screen that is displayed on the operation panel 409 in accordance with the accepted user instruction. A storage control unit 502 stores designated data in the RAM 403 or the HDD 405 or reads out designated data from the RAM 403 or the HDD 405 in accordance with an instruction from the other functional unit.

A wireless communication unit 503 controls wireless communication executed using the wireless LAN I/F 407. A wired communication unit 504 controls communication executed using the wired LAN I/F 408. An application (APP) unit 505 includes at least an event registration unit 511 and a communication monitoring unit 512, and is composed of a plurality of modules.

The event registration unit 511 transmits, to the image forming apparatus 200 via the wireless communication unit 503 or the wired communication unit 504, a registration request regarding an event to be notified to the mobile terminal 300 in the case where the event occurs in the image forming apparatus 200. Moreover, the event registration unit 511 may have a function of determining the possibility of transmission of the registration request when the transmission of the registration request to the image forming apparatus 200 is instructed, and performing transmission control in accordance with that determination result. Moreover, the event registration unit 511 also has a function of requesting the image forming apparatus 200 to cancel registration regarding an event, and performing reception of a notification regarding a registered event using WS-Eventing. Note that the event registration unit 511 has a function of managing the information regarding the event corresponding to a registration request transmitted to the image forming apparatus 200.

The communication monitoring unit 512 monitors a state of a WiFi-Direct connection using the wireless communication unit 503 and notifies, in the case where disconnection of the WiFi-Direct connection is detected, the event registration unit 511 of that detection result.

Specific embodiments will be described below in which registration regarding event notifications to the mobile terminal 300 is prevented from remaining in the image forming apparatus 200 after a communication session between the image forming apparatus 200 and the mobile terminal 300 using a WiFi-Direct connection is disconnected.

First Embodiment

In the first embodiment, an example will be illustrated in which registration regarding event notifications is prevented beforehand in the image forming apparatus 200 from remaining without being canceled after a communication session using a WiFi-Direct connection is disconnected.

In the present embodiment, upon receiving, from the mobile terminal 300, a registration request (event registration request) regarding an event to be notified to the mobile terminal 300 in the case where the event occurs in the image forming apparatus 200, the CPU 202 determines the possibility of the registration in accordance with the received registration request. Specifically, the CPU 202 determines whether or not the event registration request was received using WiFi-Direct communication, and restricts registration of the event in accordance with the event registration request in the case where the request was received using WiFi-Direct communication. On the other hand, the CPU 202 registers an event in accordance with the event registration request in the case where the event registration request is received using a communication scheme (such as a wired LAN scheme) other than WiFi-Direct communication.

FIG. 6 is a flowchart showing a procedure of event registration processing that is executed in the image forming apparatus 200. The processing of each step shown in FIG. 6 is realized in the image forming apparatus 200 by the CPU 202 reading out, to the RAM 203, a control program stored in the ROM 204 or the HDD 205 and executing the program. Note that an event registration request corresponds to a WS-Eventing Subscribe request, for example.

In step S100, the CPU 202 obtains communication I/F information indicating communication states in respective communication I/Fs (the wireless LAN I/F 212 and the wired LAN I/F 213), upon receiving an event registration request from the mobile terminal 300.

Next, in step S101, the CPU 202 determines whether or not the event registration request was received using WiFi-Direct communication. This determination can be executed by confirming based on the communication I/F information obtained in step S100 whether the event registration request was received using the wireless LAN I/F 212 or the wired LAN I/F 213. In the case where the event registration request was received using the wireless LAN I/F 212, it is determined that the event registration request was received using WiFi-Direct communication. Moreover, this determination may be performed by identifying a communication I/F corresponding to a destination address (IP address) designated in the event registration request (that is, a communication I/F in which that destination address is set).

The CPU 202 advances the operation to step S102 in the case where the request was received using communication other than WiFi-Direct communication in step S101, and advances the operation to step S103 in the case where the request was received using WiFi-Direct communication.

In step S102, the CPU 202 allows the registration of the event in accordance with the event registration request. Accordingly, the CPU 202 (the event management unit 311) stores (registers) the content of the event and a notification destination in accordance with the event registration request, and transmits a success response of the event registration to the mobile terminal 300. Note that the success response of the event registration corresponds to a WS-Eventing Subscribe response, for example. On the other hand, in step S103, the CPU 202 restricts the registration of the event in accordance with the event registration request by disallowing the registration of the event in accordance with the event registration request. After step S102 or S103, the CPU 202 ends the operation.

As described above, in the present embodiment, registration of an event in accordance with an event registration request is restricted in the case where the request is received from the mobile terminal 300 using WiFi-Direct communication. Accordingly, even in the case where a communication session using a WiFi-Direct connection is disconnected, registration regarding an event notification can be prevented from remaining without being canceled.

Second Embodiment

In the second embodiment, an example of a modification of the first embodiment is illustrated in which registration regarding an event notification is prevented beforehand in the image forming apparatus 200 from remaining without being canceled after a communication session using a WiFi-Direct connection is disconnected.

In the present embodiment, the CPU 202 performs, upon receiving an event registration request from the mobile terminal 300, registration regarding an event in accordance with the received registration request. After that, when (a communication session using) a WiFi-Direct connection to a specific mobile terminal (which is assumed here to be the mobile terminal 300) is disconnected, the CPU 202 identifies, among registered events, an event in which that mobile terminal is registered as a communication destination. Furthermore, the CPU 202 cancels the registration regarding the identified event. In this manner, in the present embodiment, registration regarding an event in which a mobile terminal related to a WiFi-Direct connection serves as a notification destination is canceled in accordance with the disconnection of the connection.

FIG. 7 is a flowchart showing a procedure of event registration processing that is executed in the image forming apparatus 200. The processing of each step shown in FIG. 7 is realized in the image forming apparatus 200 by the CPU 202 reading out, to the RAM 203, a control program stored in the ROM 204 or the HDD 205 and executing the program. Note that an event registration request corresponds to a WS-Eventing Subscribe request, for example.

In step S200, upon detecting the disconnection of an established WiFi-Direct connection (with the communication monitoring unit 312), the CPU 202 identifies a mobile terminal corresponding to the disconnected connection (that is, a mobile terminal that was the connection destination).

Next, in step S201, the CPU 202 determines whether or not an event corresponding to the identified mobile terminal (an event in which the mobile terminal serves as a notification destination) is registered. In the case where it is determined that the event in which the identified mobile terminal serves as the notification destination is registered, the CPU 202 cancels the registered event in step S202 and ends the operation. In this case, in the case where a plurality of events in which that mobile terminal is registered as a notification destination are identified, registration regarding all of those events is canceled. In the case where it is determined that an event in which the identified mobile terminal serves as a notification destination is not registered, it is not necessary to cancel the event, and therefore the operation is ended in this state.

As described above, in the present embodiment, registration regarding an event in which a mobile terminal that used to be a connection destination serves as a notification destination is canceled in accordance with disconnection of a WiFi-Direct connection. Accordingly, even in the case where a communication session using a WiFi-Direct connection is disconnected, registration regarding event notifications can be prevented from remaining without being canceled.

Third Embodiment

In the third embodiment, an example is illustrated in which registration regarding event notifications is prevented beforehand in the mobile terminal 300 from remaining in the image forming apparatus 200 without being canceled after the disconnection of a communication session using a WiFi-Direct connection.

In the present embodiment, when it is instructed that an event registration request should be transmitted to the image forming apparatus 200, the CPU 402 of the mobile terminal 300 determines the possibility of the transmission of that registration request. Specifically, the CPU 402 restricts transmission of the registration request in the case where the event registration request is to be transmitted using WiFi-Direct, and performs the transmission of that registration request in the case where a communication scheme other than WiFi-Direct (such as a wired LAN scheme) is to be used.

Figure 8:
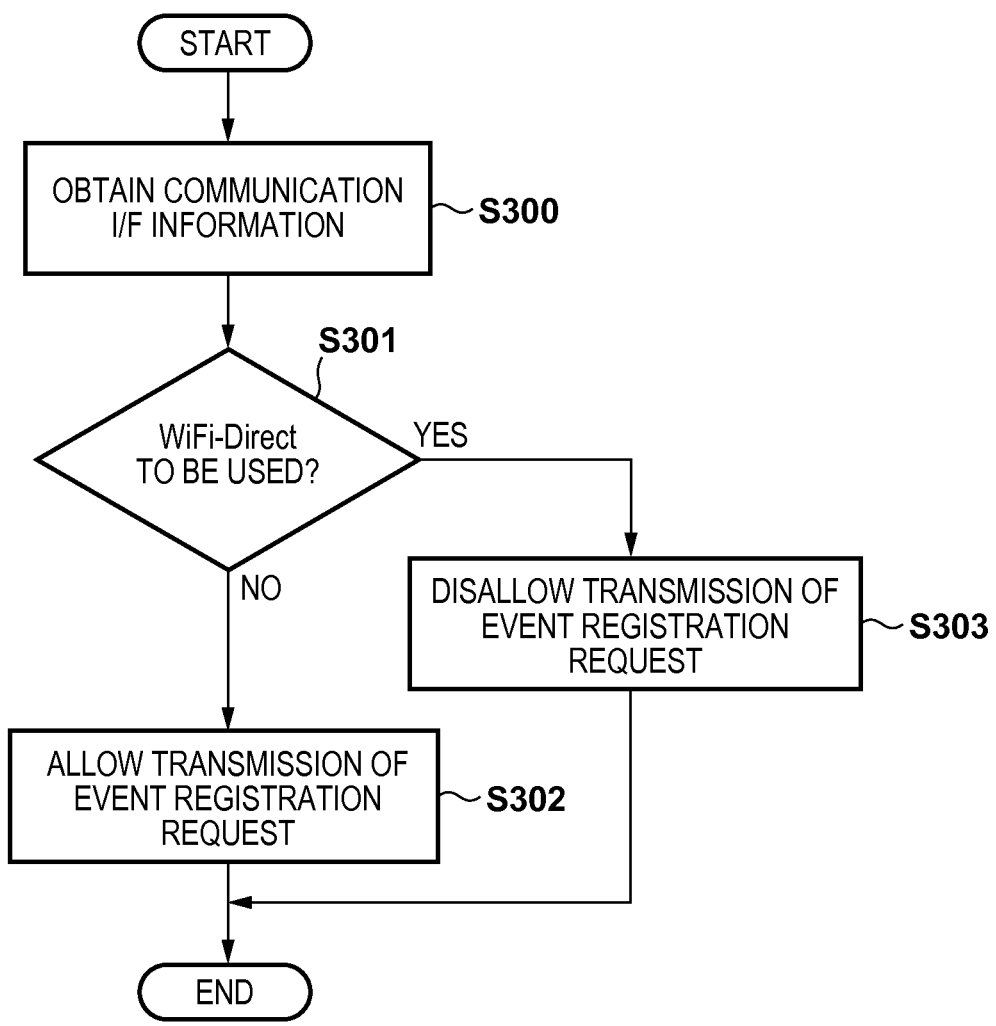
FIG. 8 is a flowchart showing a procedure of event registration processing that is executed in a mobile terminal.

FIG. 8 is a flowchart showing a procedure of event registration processing that is executed in the mobile terminal 300. The processing of each step shown in FIG. 8 is realized in the image forming apparatus 200 by the CPU 402 reading out, to the RAM 403, a control program stored in the ROM 404 or the HDD 405 and executing the program. Note that an event registration request corresponds to a WS-Eventing Subscribe request, for example.

In step S300, the CPU 402 obtains communication I/F information indicating communication states in respective communication I/Fs (the wireless LAN I/F 407 and the wired LAN I/F 408) when the transmission of the event registration request to the image forming apparatus 200 is instructed via the operation panel 409, for example.

Next, in step S301, the CPU 402 determines whether or not WiFi-Direct is to be used for transmission of the event registration request. This determination can be executed by confirming based on the communication I/F information obtained in step S100 whether a communication session using WiFi-Direct (WiFi-Direct connection) with the image forming apparatus 200, which is a transmission destination of the event registration request, has been established. This determination may also be performed by determining which of the wireless LAN I/F 407 and the wired LAN I/F 408 is used for establishing the communication session with the image forming apparatus 200, which is the transmission destination of the event registration request.

The CPU 402 advances the operation to step S302 in the case where it is determined in step S301 that a communication scheme other than WiFi-Direct is to be used, and advances the operation to step S303 in the case where it is determined that WiFi-Direct is to be used.

In step S302, the CPU 402 allows the transmission of the event registration request. Accordingly, the CPU 402 (the event registration unit 511) performs registration of the event by transmitting the event registration request to the image forming apparatus 200. On the other hand, in step S303, the CPU 402 restricts the transmission of the event registration request by disallowing transmission of the event registration request, that is, registration of the event is restricted. After step S302 or S303, the CPU 402 ends the operation.

As described above, in the present embodiment, the mobile terminal 300 restricts transmission of an event registration request using WiFi-Direct communication. Accordingly, even in the case where a communication session using a WiFi-Direct connection is disconnected, registration regarding event notifications can be prevented from remaining in the image forming apparatus 200 without being canceled.

Fourth Embodiment

In the fourth embodiment, an example of a modification of the third embodiment will be illustrated in which registration regarding event notifications is prevented beforehand in the mobile terminal 300 from remaining in the image forming apparatus 200 without being canceled after a communication session using a WiFi-Direct connection is disconnected.

In the present embodiment, the CPU 402 executes transmission without restricting transmission of an event registration request unlike the third embodiment. The CPU 402 determines whether or not an event registered by transmitting an event registration request exists in the image forming apparatus 200, which is a connection destination, when it is instructed to disconnect (a communication session using) a WiFi-Direct connection established with the image forming apparatus 200. Furthermore, in the case where such an event exists, the CPU 402 requests the image forming apparatus 200 to cancel the registered event before disconnection of the WiFi-Direct connection.

Figure 9:
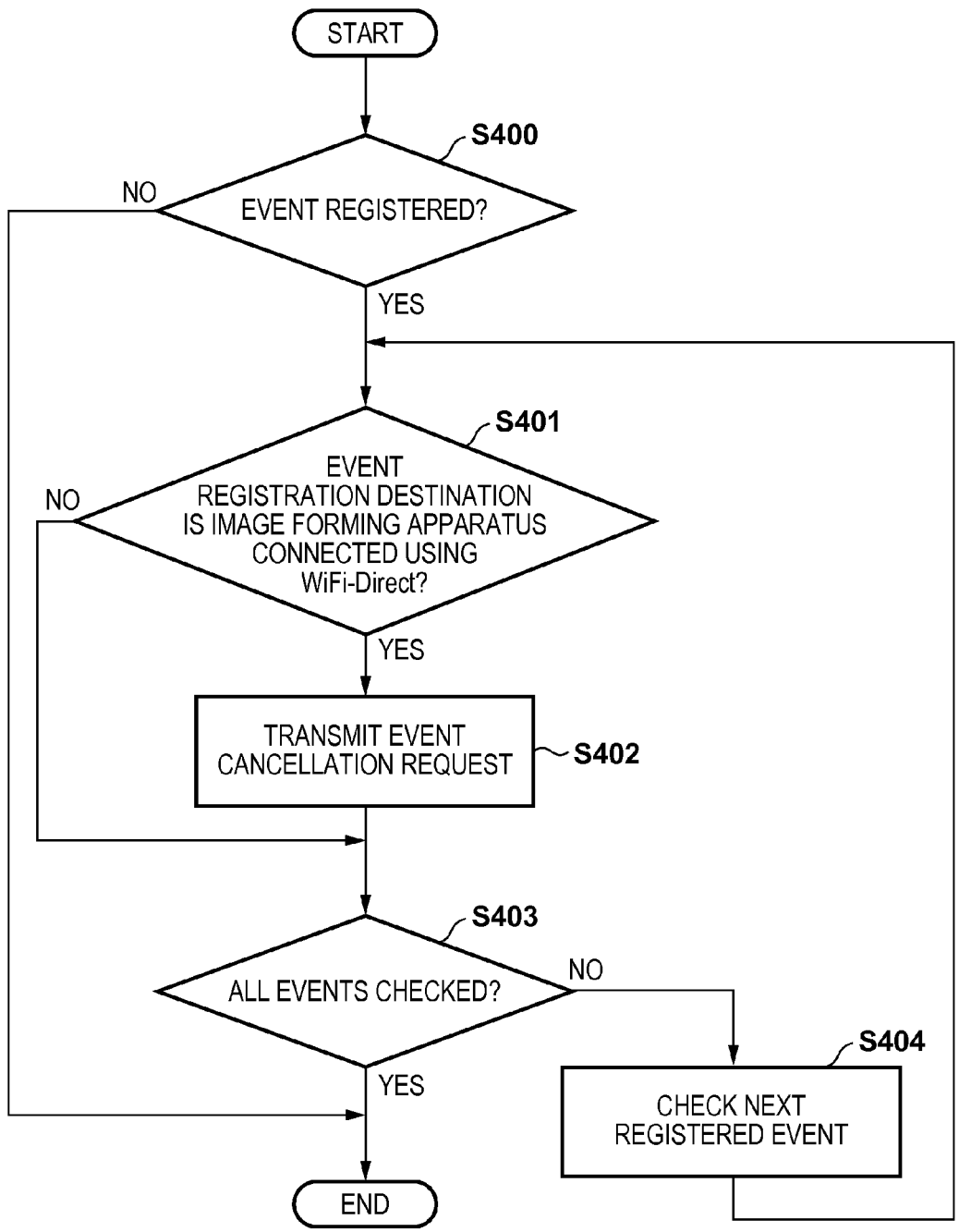
FIG. 9 is a flowchart showing a procedure of event registration processing that is executed in a mobile terminal.

FIG. 9 is a flowchart showing a procedure of event registration processing that is executed in the mobile terminal 300. The processing of each step shown in FIG. 9 is realized in the image forming apparatus 200 by the CPU 402 reading out, to the RAM 403, a control program stored in the ROM 404 or the HDD 405 and executing the program.

In step S400, the CPU 402 determines whether or not registration regarding an event notification has been performed in an external image forming apparatus, when disconnection of a WiFi-Direct connection is instructed (by the communication monitoring unit 512 to the event registration unit 511). Here, the instruction to disconnect the WiFi-Direct connection is performed due to an operation on the operation panel 409, degradation of the state of the wireless channel corresponding to the connection or the like. In the case where it is determined in step S400 that registration regarding the event notification in the external image forming apparatus has not been performed, the CPU 402 ends the operation because there is no registration of an event to be canceled, and in the case where it is determined that registration has been performed, the operation is advanced to step S401.

In step S401, the CPU 402 determines whether or not the event registration destination is the image forming apparatus 200 that is connected to the mobile terminal 300 using WiFi-Direct. In the case where the registration destination is the image forming apparatus 200, the operation is advanced to step S402, and in the case where the registration destination is not the image forming apparatus 200, the operation is advanced to step S403. In step S402, the CPU 402 transmits an event cancellation request to the image forming apparatus 200 that is the event registration destination before disconnection of the WiFi-Direct connection, and advances the operation to step S403.

In step S403, the CPU 402 determines whether or not checking regarding all of the registered events has been completed. In the case where the checking has been completed, the operation is ended, and in the case where the checking has not been completed, the operation is advanced to step S404. In step S404, the CPU 402 performs checking of the next event that is registered, and returns the operation to step S401. In this manner, in the case where a plurality of events are registered in the image forming apparatus 200 connected to the mobile terminal 300 using WiFi-Direct, cancelation requests regarding all of those events are transmitted to the image forming apparatus 200.

As described above, in the present embodiment, when disconnection of a WiFi-Direct connection is instructed, the mobile terminal 300 requests the image forming apparatus 200, which is a connection destination, to cancel a registered event before that disconnection. Accordingly, even in the case where a communication session using a WiFi-Direct connection is disconnected, registration regarding event notifications can be prevented from remaining in the image forming apparatus 200 without being canceled.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disk (CD), digital versatile disk (DVD), or Blu-ray Disk (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-180494, filed Sep. 4, 2014, which is hereby incorporated by reference herein in its entirety.

What is claimed is:

1. An information processing apparatus communicable with an external apparatus, comprising:
   a reception unit configured to receive, from the external apparatus, an event registration request that indicates a content of an event to be notified by the information processing apparatus and indicates a notification destination of the event;
   an identification unit configured to identify a communication scheme used for receiving the event registration request in a case where the event registration request is received by the reception unit; and
   a control unit configured to prohibit registration of the content of the event and the notification destination in the information processing apparatus based on the event registration request, in a case where the communication scheme identified by the identification unit is a predetermined communication scheme in which the external apparatus and the information processing apparatus execute direct wireless communication.

2. The information processing apparatus according to claim 1,
   wherein the control unit allows registration of the content of the event and the notification destination in the information processing apparatus based on the event registration request, in a case where the communication scheme identified by the identification unit is a communication scheme other than the predetermined communication scheme.

3. The information processing apparatus according to claim 2,
   wherein the communication scheme other than the predetermined communication scheme includes at least a communication scheme for executing communication via a wired LAN I/F.

4. The information processing apparatus according to claim 1,
   wherein the predetermined communication scheme is wireless communication based on Wi-Fi Direct.

5. The information processing apparatus according to claim 1,
   wherein the information processing apparatus is a printing apparatus that is capable of executing printing.

6. An information processing apparatus capable of executing direct wireless communication with an external apparatus, comprising:
   a registration unit configured to register, in the information processing apparatus, event information that indicates a content of an event to be notified by the information processing apparatus and indicates a notification destination of the event;
   a determination unit configured to determine whether or not event information corresponding to the external apparatus is registered by the registration unit, in a case where a wireless connection established between the external apparatus and the information processing apparatus is disconnected; and
   a cancellation unit configured to cancel the event information corresponding to the external apparatus in a case where the determination unit determines that the event information corresponding to the external apparatus is registered by the registration unit.

7. The information processing apparatus according to claim 6,
   wherein wireless communication executed between the external apparatus and the information processing apparatus is wireless communication based on Wi-Fi Direct.

8. The information processing apparatus according to claim 6,
   wherein the information processing apparatus is a printing apparatus that is capable of executing printing.

9. A control method for controlling an information processing apparatus communicable with an external apparatus, the method comprising:
   receiving, from the external apparatus, an event registration request that indicates a content of an event to be notified by the information processing apparatus and indicates a notification destination of the event;
   identifying a communication scheme used for receiving the event registration request in a case where the event registration request is received in the receiving; and
   prohibiting registration of the content of the event and the notification destination in the information processing apparatus based on the event registration request, in a case where the communication scheme identified in the identifying is a predetermined communication scheme in which the external apparatus and the information processing apparatus execute direct wireless communication.

10. A control method for controlling an information processing apparatus capable of executing direct wireless communication with an external apparatus, the method comprising:

registering, in the information processing apparatus, event information that indicates a content of an event to be notified by the information processing apparatus and indicates a notification destination of the event;

determining whether or not event information corresponding to the external apparatus is registered in the registering, in a case where a wireless connection established between the external apparatus and the information processing apparatus is disconnected; and canceling the event information corresponding to the external apparatus in a case where it is determined in the determining that the event information corresponding to the external apparatus is registered in the registering.

11. A non-transitory computer-readable storage medium storing a computer program for causing a computer to execute a control method for controlling an information processing apparatus communicable with an external apparatus, the method comprising:

receiving, from the external apparatus, an event registration request that indicates a content of an event to be notified by the information processing apparatus and indicates a notification destination of the event;

identifying a communication scheme used for receiving the event registration request in a case where the event registration request is received in the receiving; and prohibiting registration of the content of the event and the notification destination in the information processing apparatus based on the event registration request, in a case where the communication scheme identified in the identifying is a predetermined communication scheme in which the external apparatus and the information processing apparatus execute direct wireless communication.

12. A non-transitory computer-readable storage medium storing a computer program for causing a computer to execute a control method for controlling an information processing apparatus capable of executing direct wireless communication with an external apparatus, the method comprising:

registering, in the information processing apparatus, event information that indicates a content of an event to be notified by the information processing apparatus and indicates a notification destination of the event;

determining whether or not event information corresponding to the external apparatus is registered in the registering, in a case where a wireless connection established between the external apparatus and the information processing apparatus is disconnected; and canceling the event information corresponding to the external apparatus in a case where it is determined in the determining that the event information corresponding to the external apparatus is registered in the registering.

* * * * *